(12) United States Patent
Meier

(10) Patent No.: US 9,491,001 B2
(45) Date of Patent: Nov. 8, 2016

(54) WORK GROUP BRIDGE NOMADIC ROAMING

(71) Applicant: Cisco Technology, Inc., San Jose, CA (US)

(72) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 13/670,801

(22) Filed: Nov. 7, 2012

(65) Prior Publication Data

US 2014/0126561 A1    May 8, 2014

(51) Int. Cl.
    *H04W 4/00*    (2009.01)
    *H04L 12/46*    (2006.01)

(52) U.S. Cl.
    CPC .................. *H04L 12/4641* (2013.01)

(58) Field of Classification Search
None
See application file for complete search history.

(56) References Cited

U.S. PATENT DOCUMENTS

| | | | |
|---|---|---|---|
| 5,572,528 A * | 11/1996 | Shuen ........................... 370/402 |
| 5,862,345 A * | 1/1999 | Okanoue et al. ............. 709/238 |
| 6,130,892 A * | 10/2000 | Short et al. .................... 370/401 |
| 6,370,142 B1 * | 4/2002 | Pitcher et al. ................. 370/390 |
| 6,775,290 B1 * | 8/2004 | Merchant et al. ......... 370/395.53 |
| 6,847,620 B1 * | 1/2005 | Meier ........................... 370/328 |
| 7,301,946 B2 * | 11/2007 | Meier et al. ................... 370/390 |
| 7,346,053 B1 * | 3/2008 | Leung et al. .................. 370/390 |
| 7,350,077 B2 | 3/2008 | Meier et al. |
| 7,505,432 B2 * | 3/2009 | Leung et al. .................. 370/331 |
| 7,561,549 B2 | 7/2009 | Meier et al. |
| 7,624,270 B2 | 11/2009 | Pathan et al. |
| 7,706,345 B2 | 4/2010 | Meier et al. |
| 7,849,217 B2 | 12/2010 | Meier |
| 8,300,599 B2 * | 10/2012 | Sood et al. .................... 370/331 |
| 8,755,319 B2 * | 6/2014 | Katukam et al. .............. 370/312 |
| 2004/0103282 A1 * | 5/2004 | Meier ................ G06Q 20/3674 713/171 |
| 2007/0160017 A1 * | 7/2007 | Meier et al. ................... 370/338 |
| 2008/0063002 A1 * | 3/2008 | Zheng et al. .................. 370/401 |
| 2009/0034470 A1 * | 2/2009 | Nagarajan ........... H04L 12/1886 370/331 |
| 2009/0040995 A1 * | 2/2009 | Buddhikot et al. ........... 370/338 |
| 2010/0290398 A1 * | 11/2010 | Choudhary et al. .......... 370/328 |
| 2011/0158208 A1 * | 6/2011 | Solanki ................. H04L 12/185 370/338 |
| 2011/0228787 A1 * | 9/2011 | Tamura ......................... 370/398 |

* cited by examiner

*Primary Examiner* — Nicholas Sloms
(74) *Attorney, Agent, or Firm* — Patterson + Sheridan, LLP

(57) ABSTRACT

In an example embodiment, an 802.11 or Ethernet workgroup local area network (WG-LAN) is assigned a global name. The WG-LAN name is bound to a local virtual local area network identifier (VLAN-ID) in parent access points (APs). A path update protocol is employed to synchronize the WG-LAN/VLAN-ID bindings in a work-group bridge with the bindings of its' parent AP.

17 Claims, 3 Drawing Sheets

US 9,491,001 B2

WORK GROUP BRIDGE NOMADIC ROAMING

TECHNICAL FIELD

The present disclosure relates generally to mobile networking.

BACKGROUND

A work-group LAN (local area network) is comprised of a set of hosts that belong to the same policy group. A work-group LAN may be a wireless local area network ("WLAN," such as a WLAN compatible with the Institute of Electrical and Electronics Engineering "IEEE" 802.11 standard) service set or an Ethernet virtual LAN (or VLAN). A work-group bridge (WGB) can be employed to connect a work-group LAN to an enterprise network over a radio backhaul link.

User groups can be grouped into VLANs for security reasons. A VLAN is identified by an integer (IEEE) 802.1Q VLAN ID (VLAN identifier) that is unique within a VLAN domain. However, a VLAN ID may vary by location. For example, in a first building in a campus environment, a "guest" VLAN may be assigned to VLAN 10, while in a second building the guest VLAN may be assigned to VLAN 20. Mismatches between the work-group LAN/VLAN ID binding on the work-group bridge with VLAN ID of the parent AP can create both connectivity and security problems.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
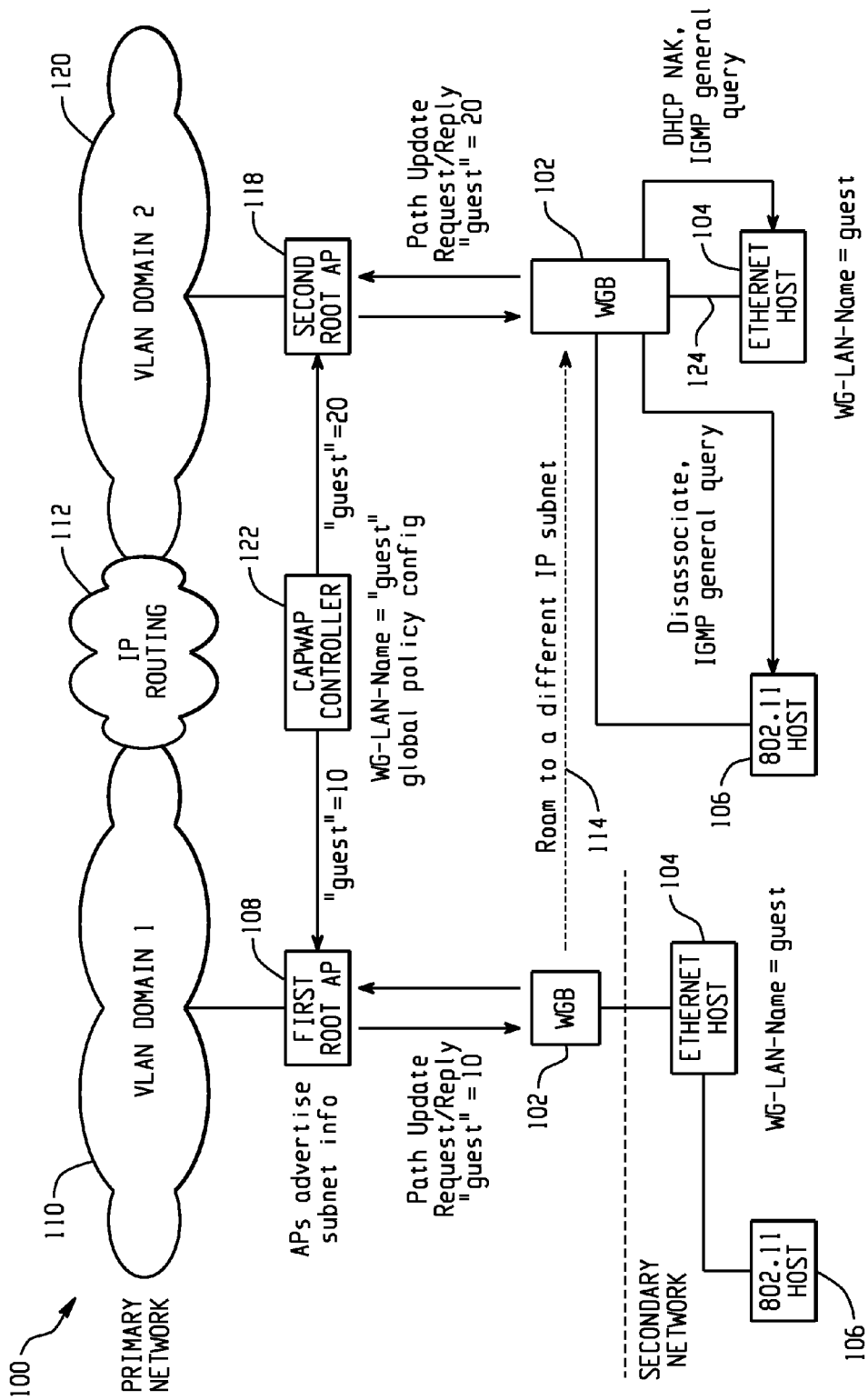
FIG. 1 is a block diagram illustrating an example of a network with a Work Group Bridge capable of implementing an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, an apparatus, comprising a transceiver, and a controller coupled with the transceiver and operable to send and receive data via the transceiver. The controller is operable to associate with a first parent access point and receive a path update message from the first parent access point. The path update message comprises bindings associating work-group networks to virtual local area network identifiers. The controller is operable to determine a virtual local area network identifier (VLAN ID) for a work-group for the first parent access point from the path update message from the first parent access point.

In accordance with an example embodiment, there is disclosed herein, logic encoded in a non-transitory, tangible computer readable medium of execution by a processor, and when executed operable to bridge a work-group local area network with an enterprise network, the work-group local area network having a name. The name can be an integer identifier or an ASCII string, for example. The logic is further operable to associate with a first parent access point associated with the enterprise network. The logic is also operable to receive from the first parent access point a list of bindings of virtual local area network identifiers to work-group local area network names for the first parent access point. The logic determines a first virtual local area network identifier (VLAN ID) for the work-group local area network from the list of bindings of virtual local area network identifiers to work-group local area network names. The logic is further operable to roam to a second parent access point associated with the enterprise network. The logic is operable to receive from the second parent access point a list of bindings of virtual local area network identifiers to work-group local area network names for the second parent access point. The logic is operable to determine a second virtual local area network identifier (VLAN ID) for the work-group local area network from the list of bindings of virtual local area network identifiers to work-group local area network names for the second access point. The logic is operable to trigger a host associated with the work-group local area network to obtain a new Internet Protocol (IP) address responsive to determining that the second parent access point is on a different subnet than the first parent access point based on the second VLAN ID being different than the first VLAN ID.

In accordance with an example embodiment, there is disclosed herein, a method that comprises bridging, by a processor, a work-group local area network with an enterprise network, the work-group local area network having a name. The method further comprises associating with a first parent access point associated with the enterprise network, receiving from the first parent access point a list of bindings of virtual local area network identifiers to work-group local area network names for the first parent access point, and determining, by the processor, a first virtual local area network identifier (VLAN ID) for the work-group local area network from the list of bindings of virtual local area network identifiers to work-group local area network names. The method also comprises roaming to a second parent access point associated with the enterprise network, receiving from the second parent access point a list of bindings of virtual local area network identifiers to work-group local area network names for the second parent access point, determining, by the processor, a second virtual local area network identifier (VLAN ID) for the work-group local area network from the list of bindings of virtual local area network identifiers to work-group local area network names for the second access point, and triggering, by the processor, a host associated with the work-group local area network to obtain a new Internet Protocol (IP) address responsive to determining that the second parent access point is on a different subnet than the first parent access point based on the second VLAN ID being different than the first VLAN ID.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in example embodiments herein are methods for synchronizing VLAN bindings on a work-group LAN (WG-LAN) with VLAN ID bindings on parent APs., Ethernet switches, and VLAN router interfaces. A WG-LAN is configured with an enterprise wide WG-LAN name. One or more WG-LAN names can be installed on a secondary Ethernet or radio port on a WGB. For example, an 802.11 WG-LAN can be installed on an AP's radio port. A bridged WG-LAN name is bound to a local VLAN ID in parent APs that are attached to Ethernet switches. When a child WGB attaches to a parent AP, a "path update" transaction is initiated by the WGB. The WGB includes a list of WG-LAN names in a path update request message. A parent AP forwards its WG-LAN name/VLAN ID bindings to the WGB in a path update reply message. The child WGB adopts the WG-LAN/VLAN ID bindings of its parent AP. A WGB determines that it has roamed to a different subnet (such as a different Internet Protocol (IP) subnet) when the WG-LAN name/VLAN ID bindings in the path update reply message are different than the current WG-LAN Name/VLAN ID bindings for the WG-LAN. When a WG-LAN roams to a different subnet, the WGB triggers the 802.11 or Ethernet hosts that are bridged by the WGB to obtain new network addresses. For example, when a WG-LAN roams to a new IP subnet, the WGB triggers the Ethernet hosts to re-initiate DHCP (Dynamic Host Configuration Protocol) to obtain new IP addresses for the new subnet and to resend IGMP (Internet Group Management Protocol) membership reports.

Any suitable technique for triggering Ethernet hosts on a WG-LAN to acquire new network (e.g., Intre-initiate DHCP may be employed). For example, an Ethernet host re-initiates DHCP when its Ethernet link is toggled (e.g., the link goes down and comes back up). Thus, in an example embodiment, when a WGB roams to a new subnet, the WGB toggles its Ethernet link to the WG-LAN to trigger the Ethernet hosts to re-initiate DHCP. As another example, the WGB may send a DHCP NAK (Negative Acknowledgement) to the 802.11 or Ethernet hosts to trigger the Ethernet hosts to re-initiate DHCP.

In an example embodiment, the WGB triggers a host to send a message comprising multicast group memberships. For example, the WGB may send a broadcast IGMP General Query on the work-group network. Hosts receiving the IGMP General Query will respond by sending an IGMP membership report.

In an example embodiment, the WGB provides bridging for a wireless network, such as a wireless local ara network (WLAN). For example, the WLAN may be an 802.11 compatible network. To trigger hosts to obtain new network (e.g., IP) addresses upon roaming to a new parent AP, a WGB can disassociate with a WLAN host. For example, the WGB may send an explicit disassociation message and/or stop sending beacons.

FIG. 1 is a block diagram illustrating an example of a network 100 with a Work Group Bridge ("WGB") 102 capable of implementing an example embodiment. The WGB 102 bridges a host or hosts on a secondary network, such as a work-group network or work-group local area network (WG-LAN) to a primary network. In the illustrated example, there is an Ethernet host 104 and a WLAN (in this example an 802.11) host 106. The number and type of hosts illustrated were selected for ease of illustration and those skilled in the art should readily appreciate that a secondary network may suitably comprise any physically realizable number of Ethernet hosts, WLAN hosts, and/or combinations of Ethernet hosts and WLAN hosts. Furthermore, not all embodiments include both Ethernet hosts and WLAN hosts.

The Ethernet host 104 is coupled with the Work Group Bridge 102 via a wired link. The WLAN host 106 is coupled to WGB 102 via a wireless link. In the illustrated example, the WGB 102 is bridging a WG-LAN having a WG-LAN name of "guest". The WGB may be connected to the primary LAN via a wired Ethernet link, a wireless radio link, or a combination of wired and wireless links.

Initially, the WGB 102 is connected to the primarily network via a first root (or parent) AP 108. The first root AP 108 is coupled to a first VLAN domain (VLAN domain 1) 110 that is coupled to an IP Routing network 112. In the example illustrated in FIG. 1, the WGB 102 roams along path 114 (which for ease of illustration is shown as a straight line but those skilled in the art should readily appreciate that any physically realizable path may be taken) to a second root AP 118 that is coupled to a second VLAN domain (VLAN domain 2) 120. A Control and Provisioning of Wireless Access Points (CAPWAP) Controller 122 disposed on the primary network is employed to associate the WG-LAN name with VLAN IDs in the VLAN domains. In the illustrated example, the WG-LAN name "guest" is associated with VLAN 10 in the first VLAN domain 110 and with VLAN 20 in the second VLAN domain 120.

Thus, from the foregoing, the same Ethernet WG-LAN and/or WLAN may be bound to a different "local" VLAN ID in different parts (e.g., IP subnets) of an enterprise network. For example, a "guest" WLAN may be bound to VLAN 10, on APs in a first building, and the guest WLAN may be bound to VLAN 20, on APs in a second building. If the WG-LAN/VLAN-ID bindings of a child AP do not match the bindings of its ancestor APs, connectivity will be lost. Thus, if WGB 102 roams to a parent AP with incompatible VLAN bindings, the stations on a bridged WLAN or Ethernet WG-LAN will lose connectivity. Accordingly, in an example embodiment, the WGB 102 sends a path update request and receives a path update reply message that comprises WG-LAN to VLAN ID bindings for its parent AP. For example, as illustrated in FIG. 1, WGB 102 can determine from the path update reply that the appropriate VLAN ID for a "Guest" WG-LAN and/or WLAN is VLAN 10 for the first root AP 108. After roaming to the second root AP 118, the WGB 102 can determine that the VLAN ID for the "Guest" WG-LAN is 20. Because the VLAN ID changed from 10 to 20, the WGB 102 can determine that it has roamed to a new subnet. Accordingly, the WGB 102 triggers the WLAN and/or Ethernet hosts to obtain new IP addresses for the new subnet.

There are several techniques available to the WGB 102 to trigger WLAN hosts 106 and/or Ethernet hosts 104 to obtain new IP addresses. For example, the WGB 102 may toggle the link 124 with Ethernet host 104. In another embodiment, the WGB 102 sends a DHCP NAK message to host 104. The WGB 102 may disassociate with WLAN host 106 to trigger WLAN host 106 to obtain a new IP address. The WGB 102 may send an explicit disassociate message to WLAN host 106 and/or may stop sending beacon frames.

Upon roaming to a new parent AP, whether on the same subnet or on a different subnet, the WGB 102 also triggers the sending of multicast membership reports by WLAN and/or Ethernet hosts. In an example embodiment, the WGB 102 sends an IGMP general query to trigger the sending of IGMP reports by the Ethernet Hosts 104 and/or WLAN hosts 106.

Figure 2:
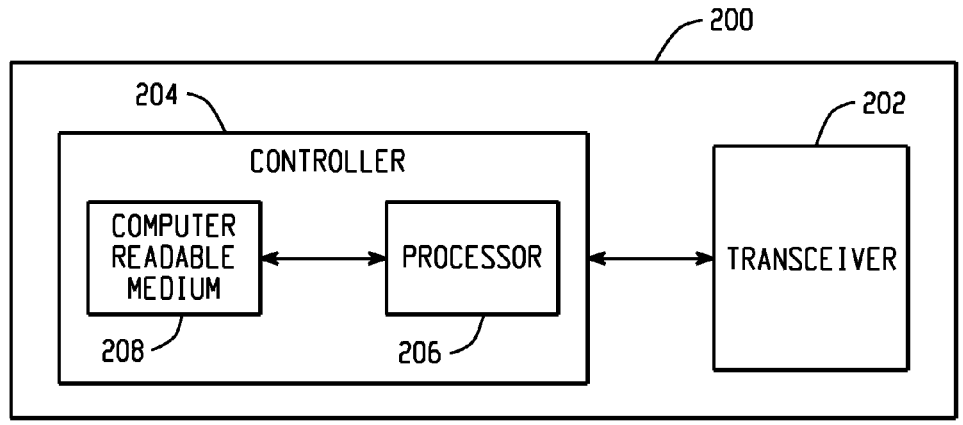
FIG. 2 is a block diagram illustrating an example of a Work Group Bridge upon which an example embodiment can be implemented.

FIG. 2 is a block diagram illustrating an example of a Work Group Bridge 200 upon which an example embodiment can be implemented. Work Group Bridge 200 is suitable for implementing the functionality of WGB 102 described in FIG. 1.

Work Group Bridge 200 comprises at least one transceiver 202. The transceiver 202 may be a wireless or wired transceiver. In an example embodiment, multiple transceivers 202 may be employed. For example, one or more transceivers 202 may be employed for communicating with the parent AP, and one or more transceivers may be employed for communicating with Ethernet and/or WLAN hosts.

The Work Group Bridge 200 further comprises a controller 204 that is operable for sending and receiving data via the at least one transceiver 202. The controller 204 comprises logic for performing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In the example illustrated in FIG. 2, the Controller 204 comprises a processor 206 coupled with a computer readable medium 208. An aspect of the example embodiment is related to the use of controller 204 for WGB nomadic roaming. According to an example embodiment, WGB nomadic roaming is provided by controller 204 in response to processor 206 executing one or more sequences of one or more instructions contained in the computer readable medium 208. Execution of the instructions contained in the computer readable medium 208 causes processor 206 to perform the functionality described herein. One or more processors in a multi-processing arrangement may also be employed to execute the instructions contained in computer readable medium 208. In alternative embodiments, hardwired circuitry may be used in place of or in combination with software instructions to implement an example embodiment. Thus, the example embodiments described herein are not limited to any specific combination of hardware circuitry and software.

The term "computer-readable medium" as used herein refers to any medium that participates in providing instructions to processor 206 for execution. Such a medium may take many forms, including but not limited to non-volatile media, and volatile media. Non-volatile media include for example optical or magnetic disks. Volatile media include dynamic memory, such as a Read Only Memory (ROM) and/or a Random Access Memory ("RAM") which in particular embodiments can be a read/write memory. As used herein, tangible media may include any non-transitory media such as a volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

In an example embodiment, the controller 204 is operable to associate with a first parent access point and receive a path update message from the first parent access point, wherein the path update message comprises bindings associating work-group networks to virtual local area network identifiers. The controller 204 is operable to determine a virtual local area network identifier (VLAN ID) for a work-group for the first parent access point from the path update message from the first parent access point.

In an example embodiment, the controller 204 is further operable to roam to a second parent access point and receive a path update message from the second parent access point, wherein the path update message from the parent second access point comprises bindings associating work-groups to virtual local area network identifiers for the second parent access point. The controller 204 is operable to determine a VLAN ID for the work-group for the second parent access point from the path update message from the second parent access point. The controller 204 compares the VLAN ID for the work-group from the first parent access point with the VLAN ID for the work-group from the second parent access point. If the VLAN ID for the work-group from the first parent access point does not match the VLAN ID for the work-group from the second parent access point, the controller 204 is further operable to trigger a host associated with the work-group to obtain a new network address. In an example embodiment, the host is an Ethernet host, and the controller 204 is operable to toggle a link with the Ethernet host to trigger the host acquiring a new network address. In another example embodiment, the host is an Ethernet host having a network address, controller 204 is operable to send a message to the host indicating the network address has expired. In particular embodiments, the network address is an Internet Protocol (IP) address. The message sent by the controller 204 is a Dynamic Host Configuration Protocol Negative Acknowledgement (DHCP NAK).

In an example embodiment, the host is a wireless local area network (WLAN) host, such as, for example, an 802.11 host. The controller 204 is operable to trigger the host to obtain a new network address by disassociating with the wireless local area network host. For example, the controller 204 may stop sending beacons for a predetermined time to disassociate with the wireless local area network host. In particular embodiments, the controller 204 is operable to send an explicit disassociation message to the wireless local area network host to disassociate with the wireless local area network host.

In an example embodiment, the controller 204 sends a message to a host to trigger the host to send a multicast group membership report responsive to roaming from the first parent access point to the second parent access point. For example, the controller 204 may send an Internet Group Management Protocol (IGMP) general query to trigger a host to send an IGMP report responsive to roaming from the first parent access point to the second parent access point.

Figure 3:
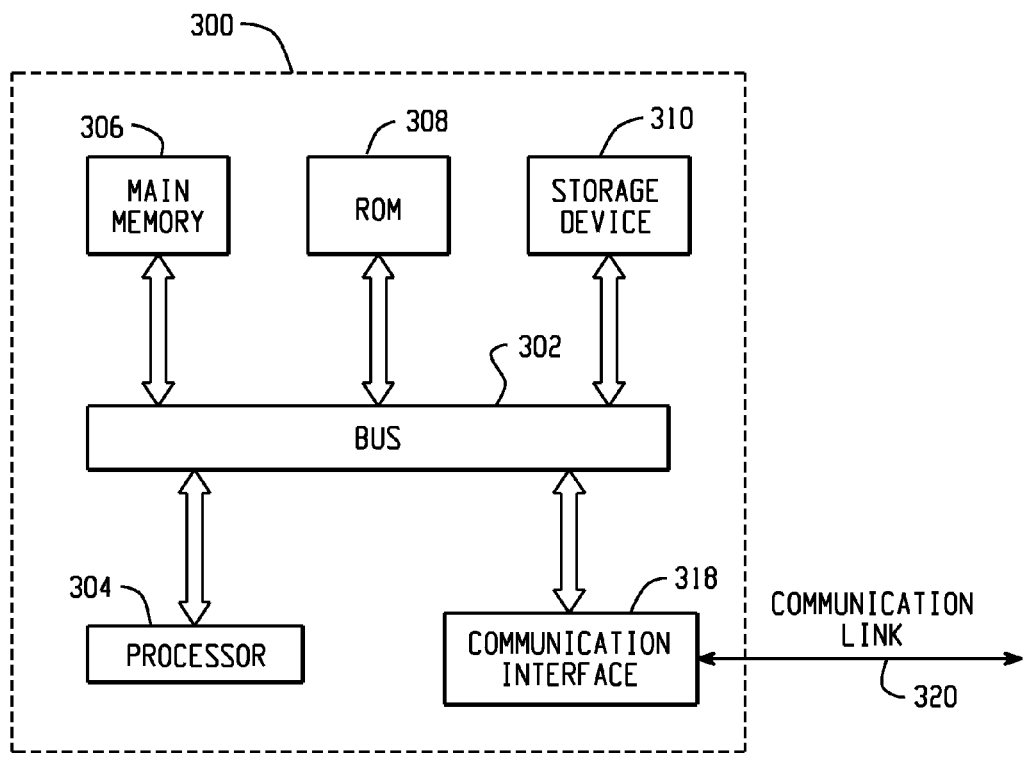
FIG. 3 is a block diagram illustrating an example of a computer system upon which an example embodiment can be implemented.

FIG. 3 is a block diagram illustrating an example of a computer system 300 upon which an example embodiment can be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, and/or flash storage, is provided and coupled to bus 302 for storing information and instructions.

An aspect of the example embodiment is related to the use of computer system 300 for work-group bridge nomadic roaming. According to an example embodiment, work-group bridge nomadic roaming is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

Computer system 300 also includes a communication interface 318 coupled to bus 302. Communication interface 318 provides a two-way data communication coupling computer system 300 to a communication link 320 for communicating with external devices. For example, communication interface 318 may be a local area network (LAN) card to provide a data communication connection to a compatible LAN. As another example, communication interface 318 may be an integrated services digital network (ISDN) card or a modem to provide a data communication connection to a corresponding type of telephone line. Wireless links may also be implemented. In any such implementation, communication interface 318 sends and receives electrical, electromagnetic, or optical signals that carry digital data streams representing various types of information.

The communication interface 318 enables computer system 300 to communicate with a parent access point and/or hosts being bridged to a network via the parent access point. In particular embodiments, multiple communication interfaces 318 may be employed. For example, one or more communication interfaces 318 may be employed for communicating with the parent access point, and one or more communication interfaces 318 may be employed for communicating with the Ethernet and/or WLAN hosts being bridged.

Figure 4:
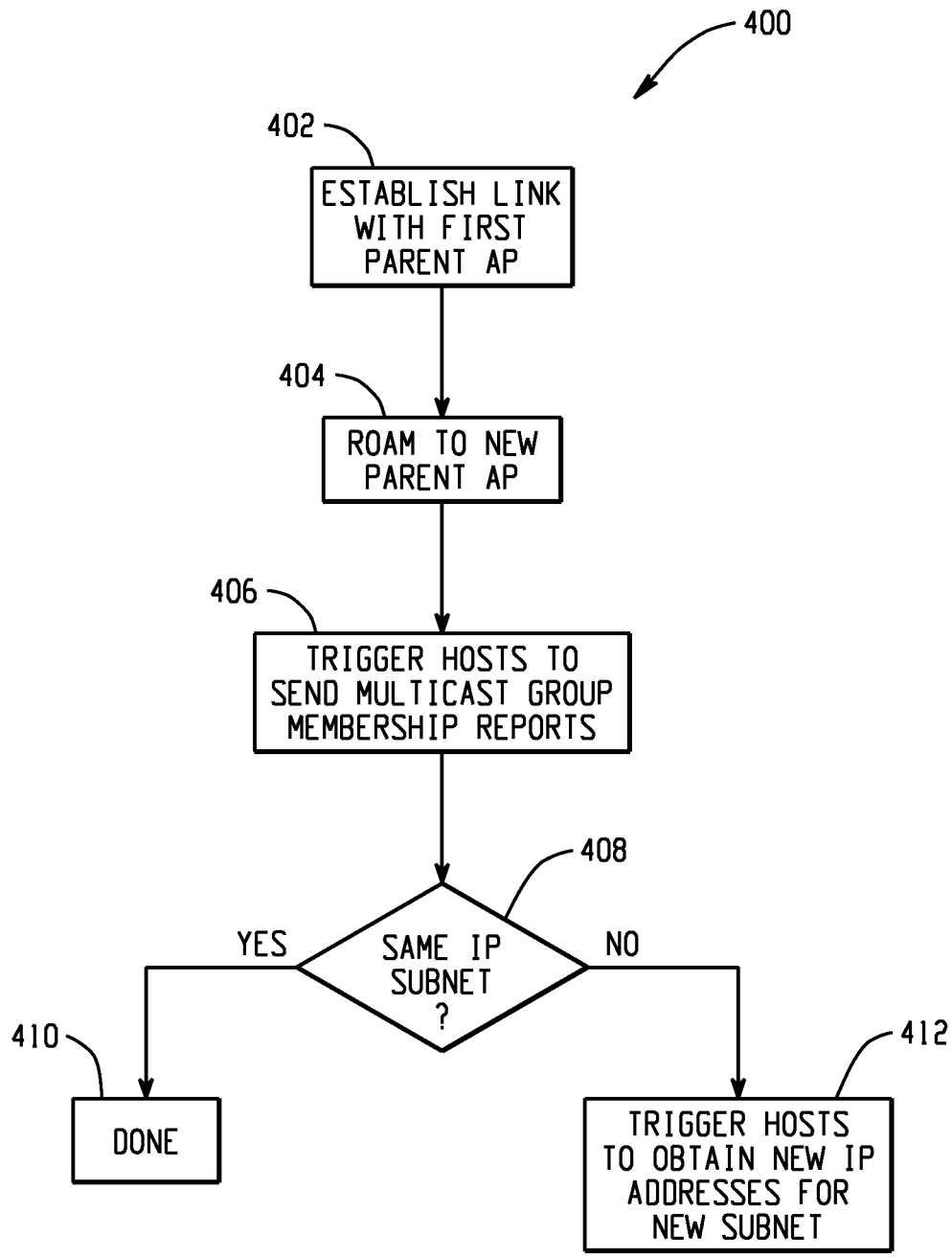
FIG. 4 is a block diagram illustrating an example of a methodology for performing nomadic roaming by a Work Group Bridge.

In view of the foregoing structural and functional features described above, a methodology 400 in accordance with an example embodiment will be better appreciated with reference to FIG. 4. While, for purposes of simplicity of explanation, the methodology 400 of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required in accordance with an example embodiment. The methodology 400 described herein is suitably adapted to be implemented in hardware, software, or a combination thereof. For example, methodology 400 may be implemented by Work Group Bridge 102 in FIG. 1, Work Group Bridge 200 in FIG. 2, and/or computer system 300 in FIG. 3.

At 402, a link is established with a first parent AP. In establishing the link with the first parent AP, a list of bindings of VLAN IDs corresponding to WG-LANs is obtained. A work-group bridge can determine, based on the name of the WG-LAN being bridged by the WGB, the appropriate VLAN ID for the WG-LAN from the list of bindings for the first parent AP. The WGB adopts the VLAN ID for the WG-LAN.

At 404, the WGB roams to a new (or second) parent AP. The WGB obtains a list of bindings of VLAN IDs corresponding to WG-LANs is obtained. The work-group bridge can determine, based on the name of the WG-LAN being bridged by the WGB, the appropriate VLAN ID for the WG-LAN from the list of bindings for the new parent AP.

At 406, the WGB triggers hosts on the WG-LAN to send (or resend) their multicast group membership reports. For example, the WGB may send a broadcast IGMP Membership Query on the WG-LAN to trigger the sending of IGMP Membership Reports.

At 408, the WGB determines whether it has roamed to a new subnet. In an example embodiment, the WGB determines whether it has roamed to a new subnet by comparing the VLAN ID for the WG-LAN for the second parent AP with the VLAN ID for the WG-LAN for the first parent AP. If the VLAN ID for the WG-LAN for the second parent AP is different than the VLAN ID for the WG-LAN for the first parent AP, the WGB determines that it has roamed to a new subnet.

If at 408, the WGB determines that it is on the same (IP) subnet (YES), then no further action needs to be taken as indicated by 410. However, if, at 408, the WGB determines that it is not on the same subnet, e.g., has roamed to a new subnet, (NO), at 412 the WGB triggers hosts to obtain new network (e.g., IP) addresses for the new subnet. There are several techniques available to the WGB to trigger a WLAN and/or an Ethernet host to obtain a new IP address. For example, the WGB may toggle the link with an Ethernet host (e.g., link 124 with Ethernet Host 104 in FIG. 1). In another example embodiment, the WGB sends a DHCP NAK message to the Ethernet host. For a WLAN host, the WGB may disassociate with WLAN host to trigger the WLAN host 106 to obtain a new IP address. For example, the WGB may send an explicit disassociate message to a WLAN host 106 and/or may stop sending beacon frames.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a transceiver;
a controller coupled with the transceiver and operable to send and receive data via the transceiver, wherein the controller is operable to:
bridge a work-group local area network with an enterprise network, the work-group local area network comprising a plurality of hosts and having a name;
associate with a first parent access point associated with the enterprise network;
receive from the first parent access point a first list of bindings of virtual local area network identifiers to work-group local area network names for the first parent access point;
determine a first virtual local area network identifier (VLAN ID) for the work-group local area network from the first list of bindings;
upon roaming to a second parent access point associated with the enterprise network, receive from the second parent access point a second list of bindings of virtual local area network identifiers to work-group local area network names for the second parent access point;
determine a second virtual local area network identifier (VLAN ID) for the work-group local area network from the second list of bindings; and
upon determining that the second parent access point is on a different subnet than the first parent access point based on the second VLAN ID being different than the first VLAN ID, trigger all of the plurality of hosts within the work-group local area network and currently bridged by the apparatus to obtain a new Internet Protocol (IP) address.

2. The apparatus set forth in claim 1, wherein the host is an Ethernet host; and the controller is operable to toggle a link with the Ethernet host to trigger the host acquiring a new network address.

3. The apparatus set forth in claim 1, wherein the host is an Ethernet host having a network address; and the controller is operable to send a message to the host indicating the network address has expired.

4. The apparatus set forth in claim 3, wherein the message is a Dynamic Host Configuration Protocol Negative Acknowledgement.

5. The apparatus set forth in claim 1, wherein the host is a wireless local area network host; and the controller is operable to trigger the host to obtain a new network address by disassociating with the wireless local area network host.

6. The apparatus set forth in claim 5, wherein the controller stops sending beacons for a predetermined time to disassociate with the wireless local area network host.

7. The apparatus set forth in claim 5, wherein the controller is operable to send an explicit disassociation message to the wireless local area network host to disassociate with the wireless local area network host.

8. The apparatus set forth in claim 1, wherein the controller sends a message to a host to trigger the host to send a multicast group membership report responsive to roaming from the first parent access point to the second parent access point.

9. The apparatus set forth in claim 1, wherein the controller sends an Internet Group Management Protocol (IGMP) general query to trigger a host to send an IGMP report responsive to roaming from the first parent access point to the second parent access point.

10. Logic encoded in a non-transitory, tangible computer readable medium of execution by a processor, and when executed operable to:
bridge a work-group local area network with an enterprise network, the work-group local area network comprising a plurality of hosts and having a name;
associate with a first parent access point associated with the enterprise network;
receive from the first parent access point a first list of bindings of virtual local area network identifiers to work-group local area network names for the first parent access point;
determine a first virtual local area network identifier (VLAN ID) for the work-group local area network from the first list of bindings;
roam to a second parent access point associated with the enterprise network;
receive from the second parent access point a second list of bindings of virtual local area network identifiers to work-group local area network names for the second parent access point;
determine a second virtual local area network identifier (VLAN ID) for the work-group local area network from the second list of bindings; and
upon determining that the second parent access point is on a different subnet than the first parent access point based on the second VLAN ID being different than the first VLAN ID, trigger all of the plurality of hosts within the work-group local area network and currently bridged by the apparatus to obtain a new Internet Protocol (IP) address.

11. The logic set forth in claim 10, wherein the host is an Ethernet host; and
the logic is further operable to toggle a link with the Ethernet host to trigger the host acquiring a new IP address.

12. The logic set forth in claim 10, wherein the host is an Ethernet host having a network address; and
the logic is further operable to send a Dynamic Host Configuration Protocol Negative Acknowledgement to the host indicating the IP address has expired.

13. The logic set forth in claim 10, wherein the host is a wireless local area network host; and
the logic is further operable to trigger the host to obtain a new IP address by disassociating with the wireless local area network host.

14. The logic set forth in claim 13, wherein the logic is further operable to stop sending beacons for a predetermined time to disassociate with the wireless local area network host.

15. The logic set forth in claim 13, further operable to send an explicit disassociation message to the wireless local area network host to disassociate with the wireless local area network host.

16. The logic set forth in claim 10, further operable to send an Internet Group Management Protocol (IGMP) general query to trigger a host to send an IGMP report responsive to roaming from the first parent access point to the second parent access point.

17. A method, comprising:
bridging, by a processor, a work-group local area network with an enterprise network, the work-group local area network comprising a plurality of hosts and having a name;

associating with a first parent access point associated with the enterprise network;

receiving from the first parent access point a first list of bindings of virtual local area network identifiers to work-group local area network names for the first parent access point;

determining, by the processor, a first virtual local area network identifier (VLAN ID) for the work-group local area network from the first list of bindings;

roaming to a second parent access point associated with the enterprise network;

receiving from the second parent access point a second list of bindings of virtual local area network identifiers to work-group local area network names for the second parent access point;

determining, by the processor, a second virtual local area network identifier (VLAN ID) for the work-group local area network from the second list of bindings; and upon determining that the second parent access point is on a different subnet than the first parent access point based on the second VLAN ID being different than the first VLAN ID, triggering, by the processor, all of the plurality of hosts within the work-group local area network and currently bridged by the apparatus to obtain a new Internet Protocol (IP) address.

* * * * *